United States Patent
Moth et al.

(10) Patent No.: US 7,411,984 B1
(45) Date of Patent: Aug. 12, 2008

(54) METHOD OF PROVIDING TONE INFORMATION TO NODES IN A PACKET NETWORK

(75) Inventors: Albert T Moth, London (GB); William Parton, London (GB)

(73) Assignee: Nortel Networks Limited, St. Laurent, Quebec (CA)

(*) Notice: Subject to any disclaimer, the term of this patent is extended or adjusted under 35 U.S.C. 154(b) by 1611 days.

(21) Appl. No.: 09/794,125

(22) Filed: Feb. 27, 2001

(51) Int. Cl.
*H04L 12/66* (2006.01)
*H04L 5/22* (2006.01)
*G06F 15/16* (2006.01)
*H04J 3/12* (2006.01)
*H04M 11/00* (2006.01)
*H04M 11/64* (2006.01)

(52) U.S. Cl. .............. 370/525; 370/298; 370/352; 370/389; 379/88.13; 379/88.24; 379/93.35; 709/203

(58) Field of Classification Search ............ 370/352, 370/401, 525, 526, 298, 400, 278, 356, 353, 370/395.2, 410, 259, 389, 299, 392; 379/93.26, 379/93.27, 93.28, 93.29, 88.17, 88.13, 88.24, 379/93.35, 142.11; 709/203, 208, 219, 228
See application file for complete search history.

(56) References Cited

U.S. PATENT DOCUMENTS

| | | | | |
|---|---|---|---|---|
| 5,732,130 A * | 3/1998 | Iapalucci et al. | ....... | 379/221.12 |
| 5,737,331 A * | 4/1998 | Hoppal et al. | ........... | 370/349 |
| 6,021,126 A * | 2/2000 | White et al. | ........... | 370/352 |
| 6,205,209 B1 * | 3/2001 | Goldberg et al. | ........ | 379/93.15 |
| 6,215,863 B1 * | 4/2001 | Bennett et al. | ......... | 379/221.09 |
| 6,259,691 B1 * | 7/2001 | Naudus | ............ | 370/352 |
| 6,282,569 B1 * | 8/2001 | Wallis et al. | ........... | 709/224 |
| 6,285,683 B1 * | 9/2001 | Lin | ............ | 370/466 |
| 6,373,835 B1 * | 4/2002 | Ng et al. | ............ | 370/352 |
| 6,377,568 B1 * | 4/2002 | Kelly | ............ | 370/352 |
| 6,381,627 B1 * | 4/2002 | Kwan et al. | ......... | 709/201 |
| 6,392,999 B1 * | 5/2002 | Liu et al. | ............ | 370/260 |
| 6,400,709 B1 * | 6/2002 | Yousseff | ............ | 370/352 |
| 6,456,601 B1 * | 9/2002 | Kozdon et al. | ......... | 370/259 |
| 6,480,586 B1 * | 11/2002 | Hayes et al. | ........ | 379/102.02 |
| 6,603,760 B1 * | 8/2003 | Smyk | ............ | 370/352 |
| 6,661,881 B1 * | 12/2003 | Garland et al. | ........ | 379/106.09 |
| 6,701,131 B2 * | 3/2004 | Kicklighter et al. | ...... | 455/67.11 |

(Continued)

OTHER PUBLICATIONS

'White Paper'—Tollbridge, dated Mar. 2000 (4 pages).

*Primary Examiner*—Hanh Nguyen
(74) *Attorney, Agent, or Firm*—Barnes & Thornburg LLP

(57) ABSTRACT

Telephone tones such as dialing tones and busy or engaged tones differ in different countries and in traditional telephone networks it has been possible to deal with this because national telephone networks have been used. However, with the advent of next generation communications networks in which telephone services are transmitted over a packet network, a need has arisen to manage telephone tones in a more sophisticated manner. To address this, a tone service provides telephone tone information to tone recipients such as media gateways, session initiation protocol (SIP) phones and virtual media gateways. In the event that a new tone recipient is added to the packet network, the tone service is able to automatically provide appropriate telephone tone information to that new tone recipient. Similarly, if telephone tones need to be upgraded or rolled back, the tone service is able to automatically provide appropriate telephone tone information to each of the tone recipients.

24 Claims, 5 Drawing Sheets

U.S. PATENT DOCUMENTS

| | | | |
|---|---|---|---|
| 6,801,521 B1 * | 10/2004 | Shaffer et al. | 370/352 |
| 6,801,526 B1 * | 10/2004 | Stahl et al. | 370/352 |
| 6,888,829 B1 * | 5/2005 | Cook et al. | 370/392 |
| 6,888,839 B1 * | 5/2005 | Scoggins et al. | 370/410 |
| 6,999,478 B2 * | 2/2006 | D'Angelo | 370/522 |
| 7,039,175 B1 * | 5/2006 | Foltak et al. | 379/229 |
| 7,068,598 B1 * | 6/2006 | Bryson et al. | 370/230 |
| 2003/0095541 A1 * | 5/2003 | Chang et al. | 370/352 |
| 2004/0246949 A1 * | 12/2004 | Cannon | 370/352 |

* cited by examiner

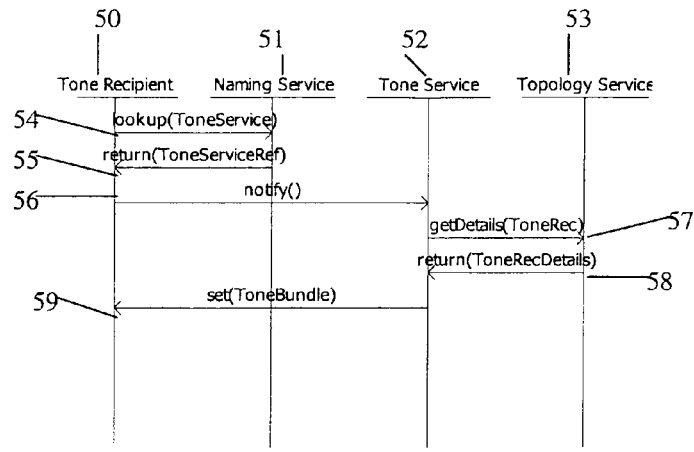
Figure 4
| kind | location | bundleId |
|------|----------|----------|
| ue9k | France | AdvancedFrenchv1 |
|  | Spain | AdvancedSpanishv2 |
| ue9k | Belgium | AdvancedBelgianv2 |
Figure 5
| kind | location |
|------|----------|
| ue9k | France |
| ue9k | Spain |
Figure 6
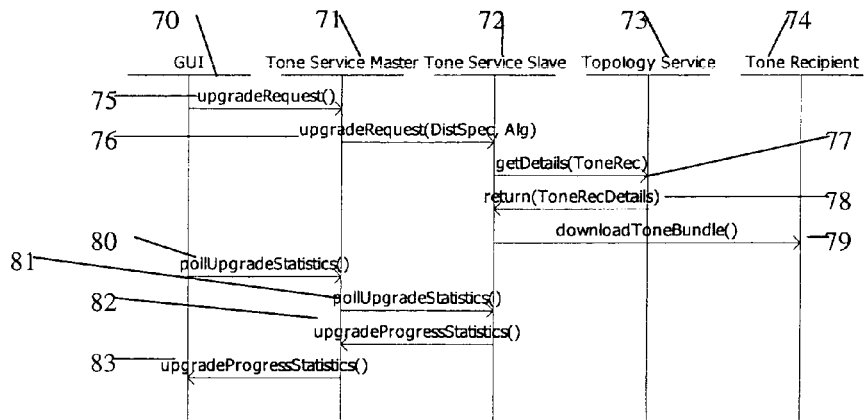
Figure 7

METHOD OF PROVIDING TONE INFORMATION TO NODES IN A PACKET NETWORK

FIELD OF THE INVENTION

The present invention relates to a method and apparatus for providing tone information to nodes in a packet network.

BACKGROUND TO THE INVENTION

The term "tone information" is used to refer to information about sounds that are used to indicate the status of an apparatus such as a telephone, facsimile machine or data communications apparatus.

Telephone tones such as dialling tones and busy or engaged tones differ in different countries and in traditional telephone networks it has been possible to deal with this because national telephone networks have been used. However, with the advent of next generation communications networks in which telephone services are transmitted over a packet network, a need has arisen to manage telephone tones in a more sophisticated manner. Similar tone information is also used by facsimile machines and data communication systems and here the same problems arise.

Traditional telephone networks, have typically been deployed within national boundaries and using a relatively small number of large switches. Each switch is provided with information about telephone tones that should be applied in particular circumstances. This is usually achieved by separately configuring each switch with the relevant tone information. Next generation networks, on the other hand, often span more than one national boundary and thus the problem of providing the correct country specific tone information to particular nodes in the network arises. A particular node in a next generation network may serve terminals in different countries for example. In addition, the number of nodes in next generation networks which require tone information is typically much greater than the number of switches requiring such information in traditional telephone networks. Also, in next generation networks nodes which require tone information are frequently added during expansion of the network and need to be provided with the correct tone information quickly and efficiently. As well as this, upgrades or changes to telephone tones need to be accommodated whereas in traditional telephone networks changes to telephone tones were rarely required.

An object of the present invention is to provide a method of providing tone information to nodes in a packet network over which telephone services are transmitted which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to a first aspect of the present invention there is provided a method of providing tone information to at least one of a plurality of nodes in a packet network over which telephone services are transmitted. Each of the nodes has one or more attributes, and the method comprises the steps of:
  accessing tone information;
  accessing a plurality of rules about which tone information is to be provided to nodes with which attributes in the communications network;
  obtaining information about the attributes of a particular node in the communications network;
  determining which tone information is to be sent to the particular node on the basis of the rules and the obtained information about attributes of the particular node; and
  sending the determined tone information to the particular node.

This method may be carried out for example, by a tone server in a Succession (trade mark of Nortel Networks) network. In a preferred example the tone information is telephone tone information. The method enables the tone server to access telephone tone information from a central location which can easily be controlled and accessed. The method is suitable for use with next generation networks such as packet networks over which telephone services are provided. In such networks, it is required to deploy new tone recipients and this method provides an efficient and effective way of providing tone information to such new tone recipients. Similarly, if tone information needs to be changed or upgraded, then the new tone information can quickly and easily be provided to tone recipients. By using rules and attributes it is ensured that the correct tone information is provided to the tone recipients. Each tone recipient manages tone users (e.g. media gateways) which may be in different countries where tone requirements vary. Also, individual tone recipients and users often require tone information in particular formats and arrangements depending on how those tone users were manufactured. The rules and attributes enable appropriate tone information to be provided even for tone users in different countries and of different manufacturers. The attributes comprise information about tone recipients, such as location information and type (e.g. element manager or session initiation protocol (SIP) phone).

Preferably, the information about the attributes of a particular nodes are accessed from a topology service connected to the packet network. Alternatively, this information is obtained during a registration process whereby each tone recipient registers with a tone server when it is first connected to the network.

The method may further comprise connecting the tone recipient to the packet network and providing the tone information automatically. This has the advantage that a "plug and play" functionality is obtained. New tone recipients can quickly and easily be added to the network and are automatically provided with appropriate tone information to suit their requirements.

The method is also advantageous for upgrading or rolling back tone information in a packet network. In that case a tone recipient is provided with tone information which upgrades tone information already available at that node. The tone server is also arranged to receive information about receipt of the tone information sent to the tone recipient and to store that information. This information can be used to determine the extent of an upgrade, which takes time to complete, and can be used to identify any tone recipients where upgrade attempts failed.

According to another aspect of the present invention there is provided a method of operating a tone recipient in order to obtain tone information. For example, the tone recipient may be a media gateway. The method comprises the steps of:—
  sending a request for tone information to a tone server;
  receiving tone information from the tone server, said tone information being suitable for use by the tone recipient to manage one or more tone users associated with the tone recipient.

This provides the advantage that a tone recipient, such as a media gateway, is able to request tone data from a tone server, which is part of a single tone service.

Preferably the tone recipient sends a request to a naming service for the address of the tone server. This is advantageous in the case that a plurality of tone servers are present. By ensuring that the tone recipient requests the address of a single tone server, the advantage that the tone recipient only knows about that single tone server is achieved.

According to another aspect of the present invention there is provided a tone recipient arranged to obtain tone information. The tone recipient comprises

- a processor arranged to send a request for tone information to a tone service in the case that the tone recipient has no appropriate tone information; and
- an input arranged to receive tone information from the tone server, said tone information being suitable for use by the tone recipient to manage one or more tone users associated with the tone recipient.

For example, the tone recipient may be a media gateway, a virtual media gateway, or a SIP telephone as mentioned above.

According to another aspect of the present invention there is provided a tone server for providing tone information to at least one of a plurality of nodes in a packet network over which telephone services are transmitted each of said nodes having one or more attributes. The tone server comprises:

- an input arranged to access tone information;
- a store comprising a plurality of rules about which tone information is to be provided to nodes with which attributes in the communications network;
- an input arranged to receive information about the attributes of a particular node in the communications network;
- a processor arranged to determine which tone information is to be sent to the particular node on the basis of the rules and the obtained information about attributes of the particular node; and
- an output arranged to send the determined tone information to the particular node.

This provides the advantage that tone information is accessed by the tone server, for example, from a centralised location, and provided to tone recipients as appropriate.

Preferably the tone information is accessed from a light weight directory access protocol (LDAP) server. This provides the advantage that information stored on the LDAP server can easily and effectively be shared with the tone server and with other tone servers if required.

In one embodiment the tone server further comprises a user interface via which a user is able to edit the tone information and the rules. The user interface may also enable a user to control use of the apparatus to initialise new nodes or to upgrade tone information throughout the packet network. This enables network operators to easily manage tone information throughout their next generation networks.

According to another aspect of the present invention there is provided a packet network suitable for transmitting telephone services comprising at least one tone server as defined above, said tone server being arranged to manage one or more tone recipients. Preferably, the packet network comprises a plurality of these tone servers. For example, the tone servers may be in different countries and enable the network to serve many tone users over large geographic areas. In the case that a plurality of tone servers are used it is especially important to avoid conflicts or inconsistencies in telephone tone data provided by those different tone servers. In order to address this problem such a packet network may be used by assigning one of the tone servers to be a master tone server and assigning the other tones servers to be slave tone servers. In addition the method may involve sending a plurality of rules from the master tone server to each of the slave servers for use by those slave servers in providing tone information. This enables a consistent set of rules to be sent out and used by each tone server.

According to another aspect of the present invention there is provided a computer program. The computer program is arranged to control a tone server in order to provide tone information to at least one of a plurality of nodes in a packet network over which telephone services are transmitted. Each of the nodes has one or more attributes and the computer program is arranged to control the tone server such that:

- tone information is accessed;
- a plurality of rules are accessed about which tone information is to be provided to nodes with which attributes in the communications network;
- information is obtained about the attributes of a particular node in the communications network;
- tone information is selected to be sent to the particular node on the basis of the rules and the obtained information about attributes of the particular node; and
- the selected tone information is sent to the particular node.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 4 is a message sequence chart for a method of providing tone information to a tone recipient.

FIG. 5 is a table showing an example of a distribution specification.

FIG. 6 is a table containing two queries.

FIG. 7 is a message sequence chart for a method of upgrading tone information in a packet network.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
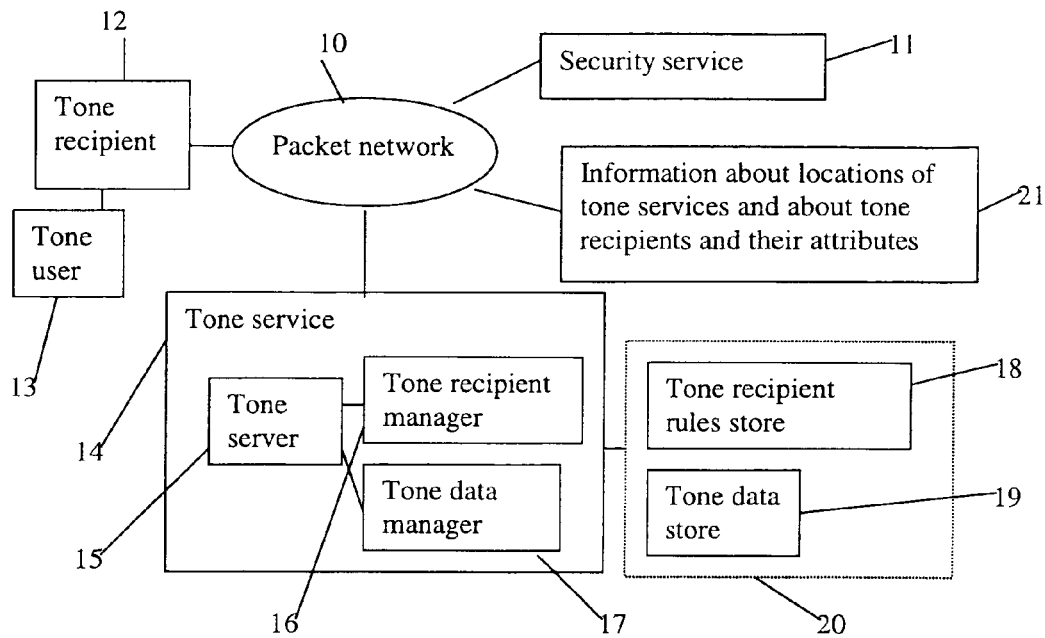
FIG. 1 is a schematic diagram of a packet network with a tone service.

FIG. 1 is a schematic diagram of a packet network 10 and a tone service 14 where the tone service is arranged to provide tone information to one or more tone recipients 12 that are part of the packet network 10. In the event that a new tone recipient 12 is added to the packet network 10, the tone service preferably automatically provides appropriate tone information to that new tone recipient. Similarly, if tones need to be upgraded or rolled back, the tone service 14 is able to automatically provide appropriate tone information to each of the tone recipients.

The packet network 10 is a next generation network, that is, a packet communications network over which telephone services are transmitted. For example, the packet network 10 may have a Succession (trade mark) architecture as currently commercially available from Nortel Networks.

A white paper entitled "Voice over Next Generation Networks" March 2000, produced by Toll Bridge Technologies Inc of 3121 Jay Street, Santa Clara, Calif. 95054, and available on the internet at http://www.totaltele.com describes next generation networks and is incorporated herein by reference.

The tone recipients 12 are any suitable node in the packet network 10 which require tone information. For example, in a Succession network architecture, tone recipients 12 include elements managers and session initiation protocol (SIP) phones as described below with reference to FIG. 3. In a succession architecture tone recipients 12 may also be media gateways connected directly to a tone server. One or more tone users 13 may be connected to each tone recipient 12 and receive telephone tone information from the associated tone recipient. For example, in a Succession network architecture, tone users comprise Media Gateways. In the case that the tone recipient is a SIP phone that SIP phone is also a tone user.

The tone service itself 14 comprises one or more tone servers 15, each tone server being connected to or comprising a tone recipient manager 16 and a tone data manager 17. If several tone servers 15 are used these are typically located in and serve different parts of the network although this is transparent to the tone recipients. That is, from a tone recipient's view point there is simply a single tone service even though that tone service may comprise many separate tone servers.

The tone recipient manager manages tone provisioning (which telephone tones go where) and comprises a user interface to enable an operator to control tone provisioning. Preferably the user interface is a graphical user interface.

The tone data manager controls the definitions and grouping of tones and also comprises a user interface to enable an operator to control tone definition and grouping. Again, the user interface is preferably a graphical user interface.

The tone service 14 has access to a tone recipient rules store 18 which contains rules specifying which tones are to be provided to tone recipients with particular attributes. In addition, the tone service 14 has access to a tone data store 19 which contains information about tone values (e.g. the frequency, amplitude and cadence for each telephone tone as well as the name for that tone).

The tone recipient rules store 18 and the tone data store 19 may be integral with the tone service 14 or may be connected independently to the packet network 10 as long as they are accessible by the tone service 14. Preferably, these stores are provided using a light weight directory access protocol (LDAP) server although this is not essential; any suitable type of store can be used such as flat files or a database.

The tone data store 19 preferably provides information about tone values using a tone value structure. This structure is preferably based on the format for tone definition used by the media gateway access control protocol (Megaco) management information base (MIB) as developed by Nortel Networks. That format is advantageously used for sending tone data over simple network management protocol networks (SNMP), however equivalent formats may also be used to send tone data over any other network protocol. For example, recordings of actual telephone tones could be sent using MP3 format files.

As shown in FIG. 1, a security service 11 is preferably provided, although this is not essential. The security service 11 allows messages that are sent to and from the tone service to be authenticated and signed. For example, this may be achieved by using a secure sockets layer as is known in the art or by using other known security methods such as distributed computing environment (DCE). The term "actor" is used to refer to any entity that takes part in the methods of providing tone information described herein. For example, actors include tone recipients, tone servers, tone recipient managers and tone data mangers. In a preferred embodiment, these actors are arranged such that they do not initiate a dialogue with another actor without having first established each other's identity and decided that they trust each other. The security service 11 assists with this process by verifying that an actor is who it claims to be. Also, actors are arranged such that they know that data sent from one actor to another has not been altered en route.

The tone service 14 also has access to information 21 about tone recipients within the packet network 10 and about their attributes. In a first embodiment, this information is provided by a directory service which comprises a topology service. However, in a second embodiment, no directory service is available in the packet network 10. In this case the information about tone recipients within the packet network 10 and their attributes is obtained by the tone service during a registration process. That is, in the second embodiment each tone recipient 12 must register with the tone service and during the registration process provide information about its attributes, eg. manufacturer, location, functions etc. The tone service stores this information and in so doing gradually builds up a representation of all the registered tone recipients in the packet network 10.

Figure 8:
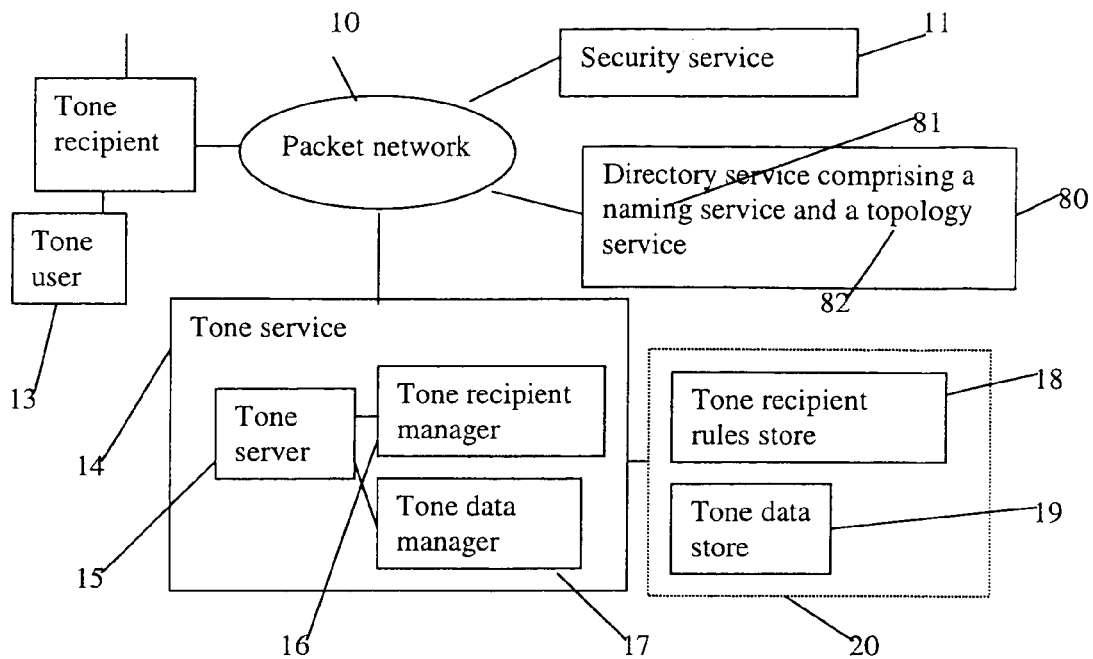
FIG. 8 is a schematic diagram of a first embodiment of a packet network with a topology service and a tone service.
Figure 9:
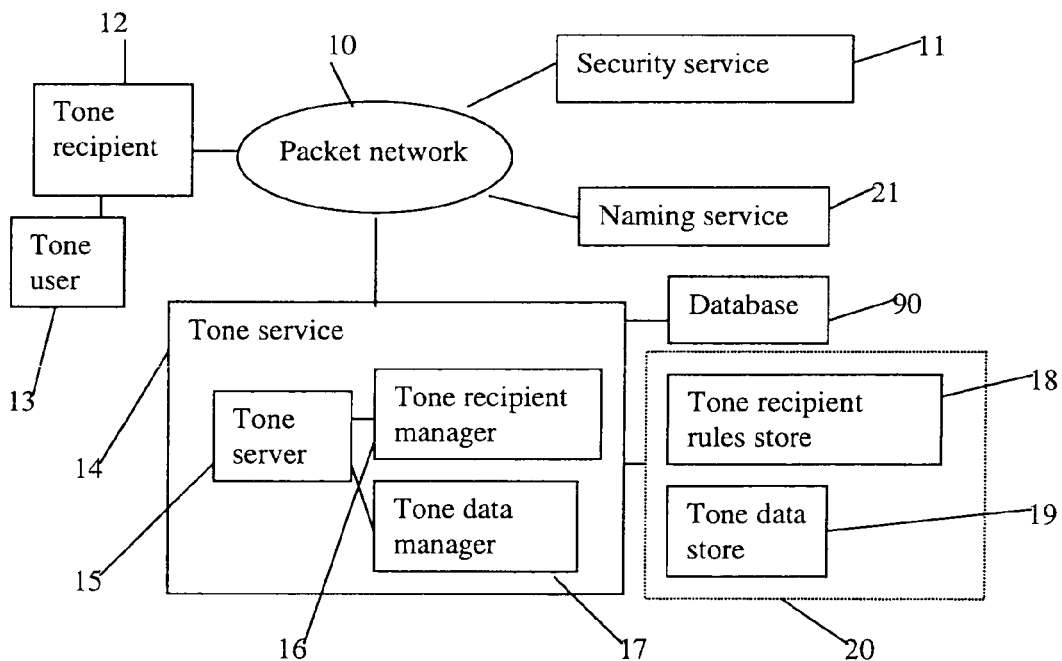
FIG. 9 is a schematic diagram of a second embodiment of a packet network with a tone service but no topology service.

FIG. 8 shows an example of the first embodiment in which a directory service 80 comprising a topology service 82 and a naming service is connected to the packet network. FIG. 9 shows an example of the second embodiment in which a naming service is available and the tone service itself builds up and maintains a database of information about locations and attributes of tone recipients.

In the case that more than one tone server 15 is used, information 21 about the locations of each of these tone servers 15 is accessible by tone recipients 12. In the first embodiment mentioned above, this information about tone server location is provided by the directory service. In the second embodiment however, the tone server location information is provided by a naming service or other suitable database connected to the packet network 10.

Figure 2:
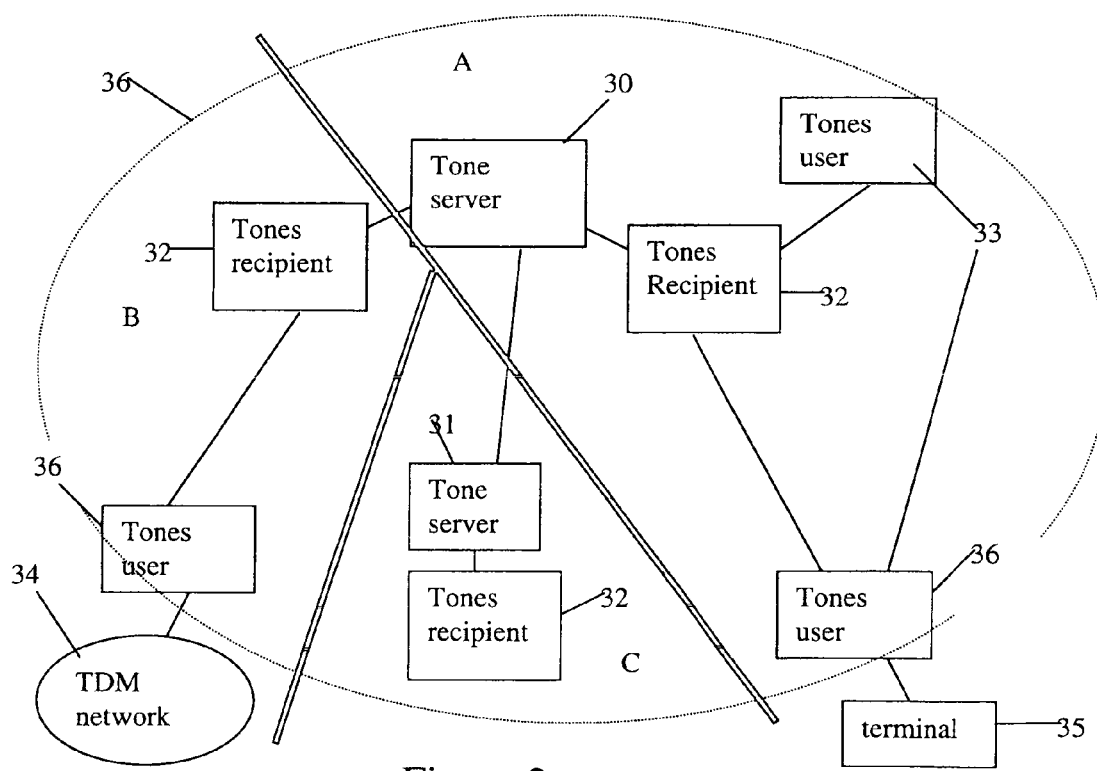
FIG. 2 is a schematic diagram of a packet network with two tone servers.

FIG. 2 is a schematic diagram of a next generation network 36 which spans three countries A, B and C as indicated by the dark lines in FIG. 2. In this case, the tone service comprises two tone servers 30, 31. One tone server 30 provides tone information to tone recipients 32 in two countries A and B whilst the other tone server 31 provides tone information to one country C. As in FIG. 1, each tone recipient 32 provides tone information to tone users 36 which may be media gateways to which terminals 35 are connected or which may be connected to a time division multiplex (TDM) network 34. The tone server 30 which serves two countries needs to have tone information to suit each country and to be able to determine which tone information to provide to which tone recipients. The tone server 31 which serves only one country requires tone information for that country, but if tone recipients 32 within that country require tone data in different formats (e.g. because they have been manufactured differently) then the tone server 31 needs to be able to cope with this.

Figure 3:
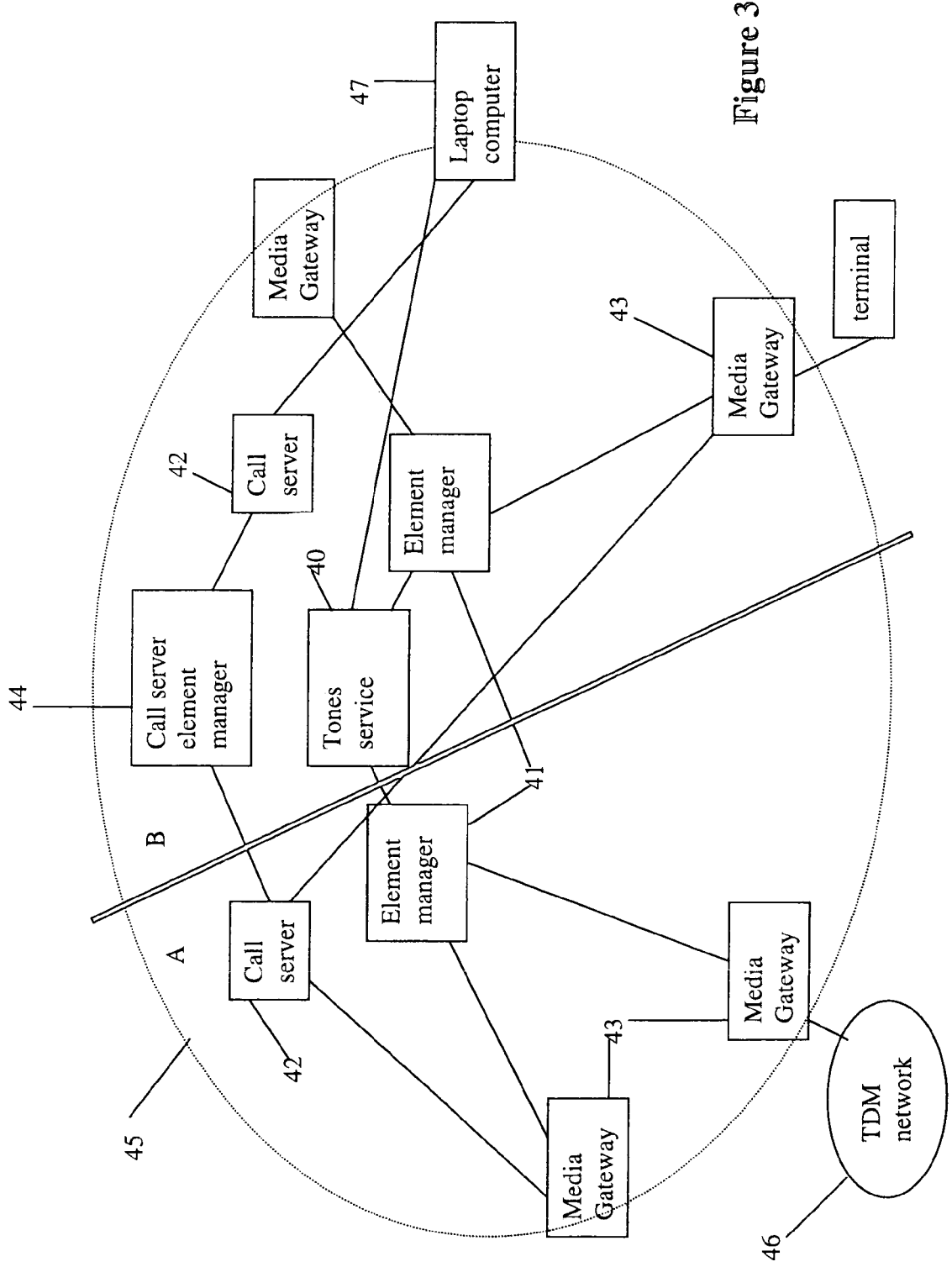
FIG. 3 is a schematic diagram of a packet network with a Succession architecture that incorporates a tone service.

FIG. 3 is a schematic diagram of a next generation network 45 which has a Succession architecture and which comprises a tones service 40. The next generation network 45 spans two countries A and B and is otherwise similar to the next generation network of FIG. 2. The tone recipients of FIG. 2 correspond to element managers 41 in FIG. 3 and the tones users of FIG. 2 correspond to media gateways 43 and laptop computers 47 in FIG. 3. The Succession network 45 also comprises a call server element manager 44 which manages a plurality of call servers 42. Using these call servers 42, telephone services are provided across the Succession packet network as is known in the art.

Tone generation is handled by the tone users (such as media gateways) at the edge of the network. This allows the tone generation capacity of the network to easily be scaled to the number of users (by adding or removing media gateways). However, the media gateways must then be responsible for the types of tone that they play to particular terminals. Also, it is necessary to ensure that all the media gateways in a particular geographic region play the correct tones, even though these media gateways may have been made by different manufacturers. The present invention enables tone information to be distributed in a standard format to any network element requesting that information. This centralises the definition and distribution of tone information.

Initialisation

Consider the situation in which it is required to add a new tone recipient such as an element manager to the Succession network of FIG. 3. The new element manager is added to the Succession network 45, say in country A and requires information about tones that it should use in order to manage media gateways. The information required depends on several factors, such as the geographical location of media gateways that the new element manager will manage or the particular type of network element being managed by the element manager.

A method by which the correct tone information is automatically provided to the new element manager is now described with reference to the message sequence chart of FIG. 4. In this example, the embodiment of FIG. 8 is used; that is, the Succession network is assumed to comprise a directory service that itself comprises a naming service and a topology service.

In the message sequence chart of FIG. 4 vertical lines are used to represent items connected to a next generation communications network. These include a tone recipient 50, a naming service 51, a tone service 52 and a topology service 53. Arrows between these vertical lines represent messages passing between the items and the relative positions of the arrows vertically on the page represents the chronological order in which the messages are sent.

When a new tone recipient 50 is connected to the next generation network and starts up, it needs to receive tone information. The tone recipient 50 sends a message 54 to the naming service 51 in order to find out the location of a tone server. The tone recipient 50 has access to pre-specified information comprising the address of the naming service 51 and the naming service 51 comprises a database of tone server addresses. As mentioned above, more than one tone server may be provided and any one of these may be used by the new tone recipient 50.

The naming service 51 sends a message 55 to the tone recipient 50 containing the location of a tone server 52 (referred to here as a tone service because there may be more than one tone server). The tone recipient then sends a notification message 56 to the tone service 52. This notification message 56 contains information identifying the new tone recipient 50.

The tone service 52 now needs to decide which tone information to send to the new tone recipient 50. This is a non-trivial problem and depends upon the kind of tone recipient involved. The tone service 52 therefore sends one or more request messages 57 to the topology service and receives messages back 58 containing information about the new tone recipient 50. For example, this information comprises information about which tone users are managed by the new tone recipient 50 and what the locations of those tone users are. In addition, information about the kind of tone recipient involved is obtained (e.g. whether the tone recipient is session initiation protocol (SIP) compatible or is a UE9000 element manager).

Once the tone service 52 has received the information from the topology service, it then needs to decide which tone information to send to the new tone recipient 50. As mentioned above, the tone service comprises a tone recipient rules store 18 which contains rules specifying which tones are to be provided to tone recipients with particular attributes. A particular set of these rules is termed a "distribution specification" and each tone server has its own distribution specification. The new tone recipient will require information about a plurality of tones and this is termed a "tone bundle" where a "tone bundle" comprises a plurality of names of tones and values for each of those tones. The rules within the distribution specification are pre-specified, for example, by a network operator.

Consider an example where the tone recipient 50 is a UE9000 element manager which manages media gateways in France and Spain and where the distribution specification is as shown in FIG. 5. The distribution specification comprises three columns, one for the type of tone recipient 60, one for the location of the tone users managed by that tone recipient 61, and one for the tone bundles that are to be sent to the corresponding tone recipient 62. In this example, the distribution specification specifies that for a UE9000 element manager that manages UE9000 network elements in France and Spain, the bundles "AdvancedFrenchv1" and "AdvancedSpanishv2" should be supplied.

The tone service 52 has used the topology service 53 to determine that the new tone recipient 50 is a UE9000 element manager with tone users in France and Spain. It then builds two queries as shown in FIG. 6 and these queries are put to the distribution specification. These queries effectively ask, "if the new tone recipient is a UE9000 element manager with tone users in France and Spain, which tone bundles are required?". The answer to these queries comprises the bundles "AdvanceSpanishv2" and "AdvancedFrenchv1". Information about the tones specified in those bundles is retrieved from the tones datastore 19 and sent to the new tone recipient 50 using message 59.

More detail about how tone bundles are selected for particular tone recipients is given below in the section headed "Distribution specifications, queries and rules".

Upgrade

A method of upgrading tone information is now described, again with reference to the embodiment of FIG. 8 in which a next generation network comprises a directory service having a naming service and a topology service. Prior to the upgrade, an operator inputs information about new tones or tone bundles to the tones service. For example, this is done using a user interface to the tones service. The operator may also add or edit rules in the distribution specification associated with each tone server.

An upgrade starts with, for example, someone pressing an upgrade button on a graphical user interface connected to a tone server. Bundles for each tone recipient are chosen in the same way as in the initialisation process. However, there are several problems associated with upgrades that need to be addressed. For example, upgrades take time to complete than one tone server is being used, then more than one distribution specification is available, one at each tone server. These distribution specifications may differ and their use during the upgrade can then lead to conflicts and inconsistencies in the upgrade. As well as this, when more than one tone service is being used, responsibility for tone recipients should advantageously be divided substantially evenly between the tone servers. However, this is difficult to achieve during upgrades. In order to ensure that only one distribution specification is used, one tone server becomes a tone service master. For example, the tone server which receives the upgrade request becomes the tone service master for the duration of the upgrade. The other tone servers are then referred to as slave tone servers. The master tone server is arranged to send a copy of its current distribution specification to the slave tone servers. This helps to ensure that only one distribution specification is used.

There are numerous ways of dividing tone recipients relatively evenly among tone servers and different algorithms can be used depending on the particular communications network. For example, one possibility is to send an upgrade algorithm to each of the slave tone servers. An example of a suitable upgrade algorithm is given below.

Upgrade Algorithm

This particular example of an upgrade algorithm uses a hash function to assign numbers in a seemingly random fashion to strings. With such a hash function there is no general way of predicting what number will be assigned to a particular string by analysing values assigned to similar strings. However, a particular string is always associated with the same number. Suppose that there are 5 tone servers and that it is required for each tone server to upgrade about one fifth of all the available tone recipients. Each tone server has a list of all the available tone recipients and each tone recipient has a unique identity. One possibility is for the tone servers to communicate with each other and decide which tone recipients they will each upgrade. However, this involves large amounts of communication and is time consuming. Instead an upgrade algorithm is used whereby each tone server selects a tone recipient and generates a number from the selected tone recipient's identity using the hash function. The tone server then divides the number by the total number of tone servers and takes the integer remainder. The remainder indicates which tone server is responsible for upgrading that tone recipient. For example, suppose the value generated by the hash function for recipient X is 4056987356987972. Dividing by 5 gives a remainder of 2 and so tone server 2 of 5 is responsible for upgrading tone recipient X. Each tone server carries out this operation in order to identify which tone recipients it is required to upgrade.

Because upgrades take time to complete and cannot be assumed to automatically succeed, the tone service is arranged to keep a record about the upgrade process. Each tone server thus keeps an upgrade record which comprises information such as which tone recipients have been successfully upgraded so far and which could not be located. A network operator is able to access this information using a user interface which requests the upgrade information from the master tone server, which in turn requests that information from each of the slave tone servers.

FIG. 7 is a message sequence chart for a method of upgrading tone information in a next generation network that comprises a topology service. In this example, the network comprises more than one tone server.

In the message sequence chart of FIG. 7 vertical lines are used to represent items connected to a next generation communications network. These include a graphical user interface (GUI) of a tones service 70, a master tone server 71, a slave tone server 72, a topology service 73 and a tone recipient 74. Arrows between these vertical lines represent messages passing between the items and the relative positions of the arrows vertically on the page represents the chronological order in which the messages are sent.

The upgrade begins with an operator activating the GUI 70 which causes an upgrade request message 75 to be sent to the master tone server 71 (that is the tone server with which the GUI 70 is associated). The master tone server 71 then sends an upgrade request message 76 to each of the slave tone servers 72. That upgrade request message 76 comprises a distribution specification and an upgrade algorithm. As explained above, by sending a distribution specification out the problem of different conflicting distribution specifications existing at different tone servers is removed. Also, the upgrade algorithm helps to ensure that responsibility for tone recipients is split relatively evenly between the available tone servers. Each slave tone server then proceeds to determine which tone bundles should be sent to its tone recipients as in the initialisation method. In order to do this each slave tone server 72 sends a "get details" message 77 to the topology service 73 which returns 78 information about tone recipients associated with that slave tone server. Using this information and the distribution specification received from the master tone server, the slave tone server determines which tone bundles to send to which tone recipients. The slave tone server 72 then downloads the selected tone bundles 79 to the selected tone recipients 74.

If a network operator wishes to access information about the status of the upgrade, the operator uses the GUI 70 in order to send a pollUpgradeStatistics message 80 to the master tone server 71. The master tone server 71 then sends a similar message 81 to each of the slave tone servers which return their results 82 to the master tone server and from there 83 to the GUI 70.

In the case that the embodiment of FIG. 9 is used, in which the communications network does not have an available topology service, then a registration process is used as mentioned above. Each tone server and tone recipient is required to register with the tones service which maintains its own database (see 90 in FIG. 9). That database is effectively used in place of the topology service.

As mentioned above, the tone recipient may be an element manager or may be another type of network node such as a session initiation protocol (SIP) telephone. In the case that the tone recipient is a SIP phone, the tone recipient is also a tone user. This is illustrated in FIG. 3 where a laptop computer 47 incorporating a SIP phone is shown in communication with the tones service via a next generation network.

Use of LDAP Server

As mentioned above a plurality of tone servers can be used and in that case it is necessary to share data from the tone data store 19 and the tone recipient rules store 18 (see FIG. 1) with each of the tone servers. This problem is addressed by using an LDAP server to store the tone data store 19 and the tone recipient rules store 18. LDAP servers are optimised for read operations and are scaleable because it is relatively easy to distribute information among them as compared with flat files or databases.

Distribution Specifications, Queries and Rules

As described above, rules are used to select which tone bundles to send to which tone recipients. For example, each rule may comprise a collection of attributes that apply to a particular bundle. Each attribute is for example, a name=value pair. A distribution specification is a collection of rules, as mentioned above.

To find the bundles required by a tone recipient, a query is used. This is a set of attributes, some of which may be wild-carded. For example, undefined attributes can be taken as wildcards, where an undefined attribute is for example, a name=value pair where the value is null. Queries are matched against the rules in a distribution specification to select the required bundles. The set of attributes contained in a selected rule are placed in a structure called a "matchinfo" structure and are used to uniquely identify that bundle.

For example, consider a tone recipient on the Franco/Belgian border. On startup, this recipient notifies the tone service of its existence. The tone service then constructs a query based on either information sent with the notification (i.e. location=France/Belgium) or information held on a topology server. The attributes in this query are then compared with the attributes of the rules in the current distribution specification with undefined attributes taken as wildcards. For each match between rules and queries, the corresponding bundle is sent to the tone recipient. In this example, we expect to find at least two matches, one for French tones and one for Belgian tones. These tone bundles are then sent to the tone recipient which becomes responsible for selecting which bundle to use.

Two restrictions are placed on rules:

No attribute name appears twice in a distribution rule.

If two rules have the same values for each attribute then they have different bundles.

Also, one restriction is placed on queries:

Every query defines the value of a particular attribute termed a "kind" attribute which denotes the type of tone recipient. For example, "kind" could be UE9000MG in the case that the tone recipient is a UE9000 media gateway.

A query is generated for each tone recipient that requires tone information. Each query is either based on a query sent by the tone recipient to the tone service or is based on information obtained from a topology service. The queries are then matched against the rules in the current distribution specification. A query matches a rule if:

each attribute name in the rule is allowable for the kind given in the query; and for every attribute in the query that is also defined in the rule, the attributes are the same.

Figure 10:
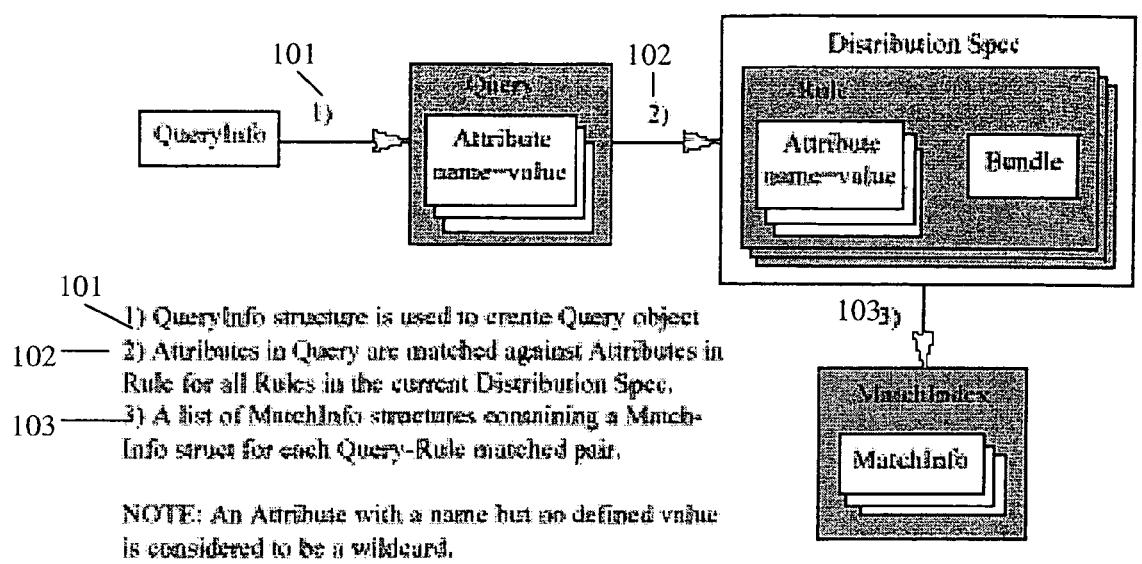
FIG. 10 is a flow diagram of a method of selecting a tone bundle using a query and a distribution specification.

FIG. 10 shows how a query is used to find a list of selected bundles from a distribution specification. First, a structure termed a "QueryInfo" structure is used to create one or more Query objects (see step 101 in FIG. 10). The attributes in each query are then matched against attributes of the rules in the distribution specification (see step 102 in FIG. 10). For each query-rule matched pair, a structure called a "Matchinfo" structure is formed as mentioned above, and these structures are stored in a list (see step 103 of FIG. 10).

A range of applications are within the scope of the invention. These include situations in which it is required to provide tone information to nodes in a packet network. For example, a packet network with a Succession architecture, or Internet Protocol (IP) or asynchronous transfer mode (ATM) packet networks.

The invention claimed is:

1. A method of providing tone information to at least one of a plurality of nodes in a packet network over which telephone services are transmitted, each of said nodes having one or more attributes comprising one or more of node location, node type and node manufacturer, said method comprising the steps of:
   a) accessing tone information;
   b) accessing a plurality of rules about which tone information is to be provided to nodes with which attributes in the communications network, the nodes being tone recipients selected from: media gateways, virtual media gateways and session initiation protocol (SIP) telephones;
   c) obtaining information about one or more attributes of a particular node in the communications network;
   d) determining which tone information is to be sent to the particular node on the basis of the rules and the obtained information about the one or more attributes of the particular node; and
   e) sending the determined tone information to the particular node in a format dependent on said one or more attributes of the particular node.

2. A method as claimed in claim 1 wherein said step of obtaining information about one or more attributes of a particular node comprises accessing a topology service connected to the packet network.

3. A method as claimed in claim 1 wherein said step of obtaining information about one or more attributes of a particular node comprises receiving that information during a registration process.

4. A method as claimed in claim 1 wherein said determined tone information is suitable for use by the particular node to manage any tone users associated with that node.

5. A method as claimed in claim 1 wherein said packet network has a Succession architecture.

6. A method as claimed in claim 1 which further comprises connecting the node to the packet network and wherein the tone information is provided to that node automatically, said tone information being suitable for use by the particular node to manage any tone users associated with that node.

7. A method as claimed in claim 1 wherein said node is provided with tone information which upgrades tone information already available at that node.

8. A method as claimed in claim 7 which further comprises the steps of receiving information about receipt of the tone information sent to the node and storing that information.

9. A method as claimed in claim 1, wherein, where the particular node is a tone recipient that provides tone information to tone users associated with said particular node, the method further comprising providing the node with the same tone information in different formats in dependence on different attributes of said node.

10. A method of operating a tone recipient in order to obtain tone information said method comprising the steps of:
    a) sending a request for tone information to a tone server;
    b) receiving tone information from the tone server in a format dependent on one or more attributes of the tone recipient, said one or more attributes comprising one or more of tone recipient location, tone recipient type and tone recipient manufacturer, said tone information being suitable for use by the tone recipient to manage one or more tone users associated with the tone recipient, the tone recipient being selected from: media gateways, virtual media gateways and session initiation protocol (SIP) telephones.

11. A method as claimed in claim 10 which further comprises sending a request to a naming service for the address of a tone server and sending said request for tone information to that tone server.

12. A method as claimed in claim 11 which further comprises registering the tone recipient with the tone server.

13. A tone recipient arranged to obtain tone information, said tone recipient comprising:
   a) a processor arranged to send a request for tone information to a tone service in the case that the tone recipient has no appropriate tone information;
   b) an input arranged to receive tone information from the tone server in a format dependent on one or more attributes of the tone recipient, said one or more attributes comprising one or more of tone recipient location, tone recipient type and tone recipient manufacturer, said tone information being suitable for use by the tone recipient to manage one or more tone users associated with the tone recipient, the tone recipient being selected from: media gateways, virtual media gateways and session initiation protocol (SIP) telephones.

14. A tone server for providing tone information to at least one of a plurality of nodes in a packet network over which telephone services are transmitted, each of said nodes having one or more attributes comprising one or more of node location, node type and node manufacturer, said tone server comprising:
   a) an input arranged to access tone information;
   b) a store comprising a plurality of rules about which tone information is to be provided to nodes with which attributes in the communications network, the nodes being tone recipients selected from: media gateways, virtual media gateways and session initiation protocol (SIP) telephones;
   c) an input arranged to receive information about one or more attributes of a particular node in the communications network;
   d) a processor arranged to determine which tone information is to be sent to the particular node on the basis of the rules and the obtained information about said one or more attributes of the particular node; and
   e) an output arranged to send the determined tone information to the particular node in a format dependent on said one or more attributes of the particular node.

15. A tone server as claimed in claim 14 wherein said tone information is accessed from a light weight directory access protocol (LDAP) server.

16. A tone server as claimed in claim 14 wherein said store comprising a plurality of rules is provided using a light weight directory access protocol (LDAP) server.

17. A tone server as claimed in claim 14 which further comprises a user interface via which a user edits the tone information and the rules.

18. A tone server as claimed in claim 14 which further comprises a user interface via which a user controls use of the apparatus to initialise new nodes or to upgrade tone information throughout the packet network.

19. A packet network suitable for transmitting telephone services comprising at least one tone server as claimed in claim 14, said tone server being arranged to manage one or more tone recipients.

20. A packet network as claimed in claim 19 comprising a plurality of said tone servers.

21. A method of using a packet network as claimed in claim 20 comprising assigning one of the tone servers to be a master tone server and assigning the other tones servers to be slave tone servers.

22. A method as claimed in claim 21 which comprises sending a plurality of rules from the master tone server to each of the slave servers for use by those slave servers in providing tone information.

23. A computer program stored on a computer readable medium and executable by a tone server in order to provide tone information to at least one of a plurality of nodes in a packet network over which telephone services are transmitted, each of said nodes having one or more attributes comprising one or more of node location, node type and node manufacturer, said computer program being arranged to control the tone server such that:
   a) tone information is accessed;
   b) a plurality of rules are accessed about which tone information is to be provided to nodes with which attributes in the communications network, the nodes being tone recipients selected from: media gateways, virtual media gateways and session initiation protocol (SIP) telephones;
   c) information is obtained about one or more attributes of a particular node in the communications network;
   d) tone information is selected to be sent to the particular node on the basis of the rules and the obtained information about the one or more attributes of the particular node; and
   e) the selected tone information is sent to the particular node in a format dependent on said one or more attributes of the particular node.

24. A method of providing tone information to at least one of a plurality of nodes in a packet network over which telephone services are transmitted, each of said nodes having one or more attributes, the packet network having a plurality of tone servers, said method comprising the steps of:
   a) accessing tone information;
   b) accessing a plurality of rules about which tone information is to be provided to nodes with which attributes in the communications network, the nodes being tone recipients selected from: media gateways, virtual media gateways and session initiation protocol (SIP) telephones;
   c) obtaining information about one or more attributes of a particular node in the communications network;
   d) determining which tone information is to be sent to the particular node on the basis of the rules and the obtained information about the one or more attributes of the particular node;
   e) sending the determined tone information to the particular node;
   f) assigning one of the tone servers to be a master tone server and assigning the other tones servers to be slave tone servers; and
   g) sending a plurality of rules from the master tone server to each of the slave servers for use by those slave servers in providing tone information.

* * * * *